US012624674B2

(12) United States Patent
Peters et al.

(10) Patent No.: US 12,624,674 B2
(45) Date of Patent: May 12, 2026

(54) FLEXIBLE FLUID CONNECTION FOR EVAPORATIVE EMISSIONS SYSTEM

(71) Applicant: Stoneridge Control Devices, Inc., Novi, MI (US)

(72) Inventors: Mark William Peters, Wolverine Lake, MI (US); Robert James Steinman, Lexington, OH (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 127 days.

(21) Appl. No.: 18/509,755

(22) Filed: Nov. 15, 2023

(65) Prior Publication Data

US 2024/0175413 A1    May 30, 2024

Related U.S. Application Data

(60) Provisional application No. 63/428,859, filed on Nov. 30, 2022.

(51) Int. Cl.
| | |
|---|---|
| *F02M 25/08* | (2006.01) |
| *F02D 41/00* | (2006.01) |
| *G01M 3/34* | (2006.01) |

(52) U.S. Cl.
CPC ....... *F02M 25/0809* (2013.01); *F02D 41/003* (2013.01); *G01M 3/34* (2013.01)

(58) Field of Classification Search
CPC .... F02D 17/04; F02D 41/042; F02D 41/1453; F02D 41/22; F02D 41/222; F02B 63/048; F02B 77/086
See application file for complete search history.

(56) References Cited

U.S. PATENT DOCUMENTS

| | | | | |
|---|---|---|---|---|
| 11,225,934 | B2 * | 1/2022 | Steinman | ........... F02M 25/0836 |
| 2009/0148329 | A1 * | 6/2009 | Kobayashi | .............. F04C 23/00 |
| | | | | 418/104 |
| 2013/0263648 | A1 * | 10/2013 | Kaneko | ..................... F16K 1/36 |
| | | | | 137/561 R |
| 2015/0252756 | A1 * | 9/2015 | Itoh | .................... F02M 25/0872 |
| | | | | 123/520 |
| 2017/0314512 | A1 * | 11/2017 | Dudar | ................ F02M 25/0836 |
| 2017/0328806 | A1 * | 11/2017 | Kaneko | .................. G01M 3/26 |
| 2019/0151876 | A1 * | 5/2019 | Yamaguchi | ......... B05B 11/0097 |
| 2019/0242777 | A1 * | 8/2019 | Young | .................... G01M 3/007 |
| 2020/0096116 | A1 * | 3/2020 | Buckley | ................. E21B 44/06 |
| 2021/0302266 | A1 * | 9/2021 | Kishi | .................. G01M 3/3272 |
| 2022/0146358 | A1 * | 5/2022 | Rakitic | .................. G01M 3/18 |
| 2024/0175413 | A1 * | 5/2024 | Peters | ............... F02M 25/0836 |

* cited by examiner

*Primary Examiner* — Joseph J Dallo
(74) *Attorney, Agent, or Firm* — Carlson, Gaskey & Olds, P.C.

(57) ABSTRACT

A leak detection module (LDM) includes a housing that provides a cavity that is enclosed by a wall that has a hole. A valve is arranged within the housing and in fluid communication along a passage that extends between first and second ports on the LDM, the valve is movable between open and closed positions. A pump is arranged within the housing and in fluid communication with the passage. A fluid fitting extends through the hole and has a passageway that extends between first and second end portions. The passageway is in fluid communication with the pump, the fluid fitting provides one of the first and second ports. A fastener secures the fluid fitting to the wall.

16 Claims, 5 Drawing Sheets

FLEXIBLE FLUID CONNECTION FOR EVAPORATIVE EMISSIONS SYSTEM

CROSS-REFERENCE TO RELATED APPLICATION

This application claims priority to U.S. Provisional Application No. 63/428,859 filed Nov. 30, 2022.

TECHNICAL FIELD

This disclosure relates to fluid fitting for an evaporative emissions system component, such as a leak detection module (LDM).

BACKGROUND

Evaporative emissions systems have long been required for gasoline powered vehicles. The system must undergo a periodic leak test during or after a vehicle drive cycle to ensure that fuel vapors will not leak into the atmosphere. The system includes leak detection module (LDM) that typically includes at least a pump and a valve to create a vacuum or pressurize the system in order to perform the test.

In one example LDM module, first and second ports are provided on a housing that encloses the valve and the pump. The ports are in fluid communication with the valve, the pump and other components that may be arranged within the LDM. A controller may also be arranged in the housing for performing the leak test. Typically, the housing is constructed from multiple plastic housing portions that are secured to one another to form the module. The ports are molded into the housing portions as a monolithic, unitary structure using dedicating injection molds for each specific vehicle application based upon LDM packaging constraints within the vehicle.

SUMMARY

In one exemplary embodiment, a leak detection module (LDM) includes a housing that provides a cavity that is enclosed by a wall that has a hole. A valve is arranged within the housing and in fluid communication along a passage that extends between first and second ports on the LDM, the valve is movable between open and closed positions. A pump is arranged within the housing and in fluid communication with the passage. A fluid fitting extends through the hole and has a passageway that extends between first and second end portions. The passageway is in fluid communication with the pump, the fluid fitting provides one of the first and second ports. A fastener secures the fluid fitting to the wall.

In a further embodiment of any of the above, the wall has first and second sides that are opposite one another. The first end portion has a flange against the first side. The fastener is secured to the second end portion adjacent the second side clamping the fluid fitting to the wall.

In a further embodiment of any of the above, the wall has first and second sides opposite one another. The first end portion has a flange against the first side. The fastener secures the flange to the first side.

In a further embodiment of any of the above, the flange is a weld.

In a further embodiment of any of the above, the LDM includes a seal that is arranged about the second end portion and between the fastener and the second side.

In a further embodiment of any of the above, the fastener includes a collar that extends from the fastener toward the second side. The seal is arranged inboard from the collar.

In a further embodiment of any of the above, the fastener includes threads.

In a further embodiment of any of the above, the threads are provided by a multi-start thread configuration.

In another exemplary embodiment, a method of assembling a leak detection module (LDM) includes arranging a pump and a valve in a housing with a hole, orienting a fluid fitting in the hole in a desired position, securing the fluid fitting to the housing at the desired position to provide a port to the LDM, and enclosing the housing. The fluid fitting is in fluid communication with the pump and the valve.

In a further embodiment of any of the above, the securing step includes welding the fluid fitting to the housing.

In a further embodiment of any of the above, the securing step includes threading a fastener onto the fluid fitting.

In another exemplary embodiment, an evaporative emissions system component includes a housing that provides a cavity that is enclosed by a wall that has a hole. The housing has first and second ports. The wall has first and second sides opposite one another. A fluid fitting has a passageway that extends between first and second end portions. The fluid fitting provides one of the first and second ports. The first end portion has a flange against the first side. A fastener is secured to the second end portion adjacent the second side to maintain the fluid fitting in a desired orientation relative to the wall.

In a further embodiment of any of the above, the system component is a leak detection module (LDM) that includes a valve that is arranged within the housing and in fluid communication along a passage that extends between the first and second ports on the LDM. The valve is movable between open and closed positions, and a pump is arranged within the housing and in fluid communication with the passage.

In a further embodiment of any of the above, the system component includes a connector that is attached to the second portion and fluidly connected to another portion of the system.

In a further embodiment of any of the above, the other portion is a charcoal canister.

In a further embodiment of any of the above, the flange is affixed to the first side.

In a further embodiment of any of the above, the system component includes a seal that is arranged about the second end portion and between the fastener and the second side.

In a further embodiment of any of the above, the fastener includes a collar that extends from the fastener toward the second side, and the seal is arranged inboard from the collar.

In a further embodiment of any of the above, the fastener includes threads.

In a further embodiment of any of the above, the threads are provided by a multi-start thread configuration.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
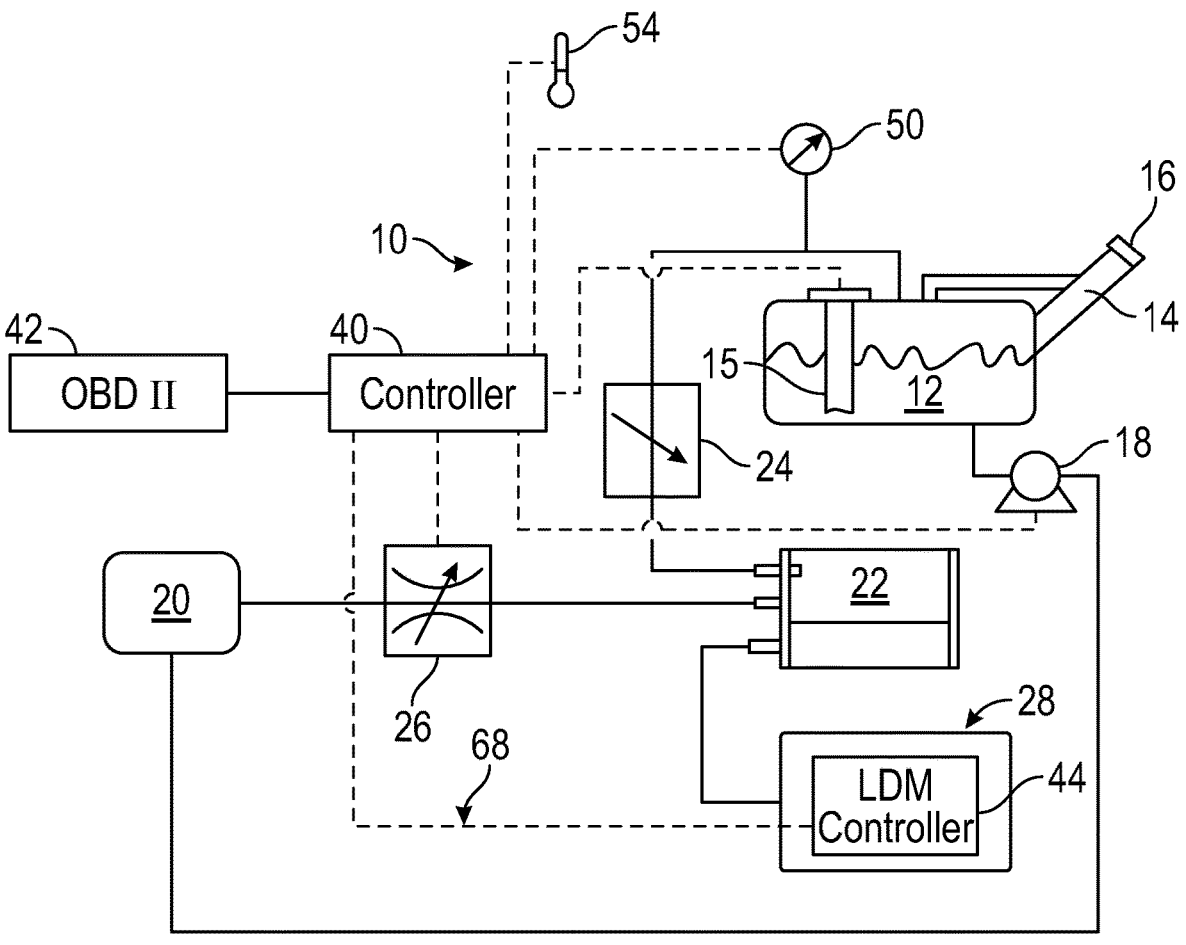
FIG. 1 schematically illustrates portions of one example evaporative fuel system.

FIG. 1 schematically illustrates a portion of an example evaporative fuel system 10. It should be understood that other types of systems may be used. The system 10 includes a fuel tank 12 having a fuel filler 14 with a fill cap 16. A fuel pump 18 supplies gasoline, for example, from the fuel tank 12 to an internal combustion engine 20, which provides propulsion to a vehicle. A fuel level sensor 15 is in communication with a controller 40, which may be an engine controller, and measures a level of fuel within the fuel tank 12, which also correlates to an amount of fuel vapor within the fuel tank 12.

The system 10 is configured to capture and regulate the flow of fuel vapors within the system. In one example, a fuel tank isolation valve (FTIV) 24 is arranged fluidly between the fuel tank 12 and a charcoal canister 22, which captures and stores fuel vapors for later use by the engine 20. A purge valve 26 is fluidly connected between the canister 22 and the engine 20. In one example, the controller 40 regulates a position of the purge valve 26 during engine operation in response to a purge command from the engine controller 40, for example, to selectively provide the fuel vapors to the engine 20 during fuel combustion to make use of these fuel vapors.

Figure 2:
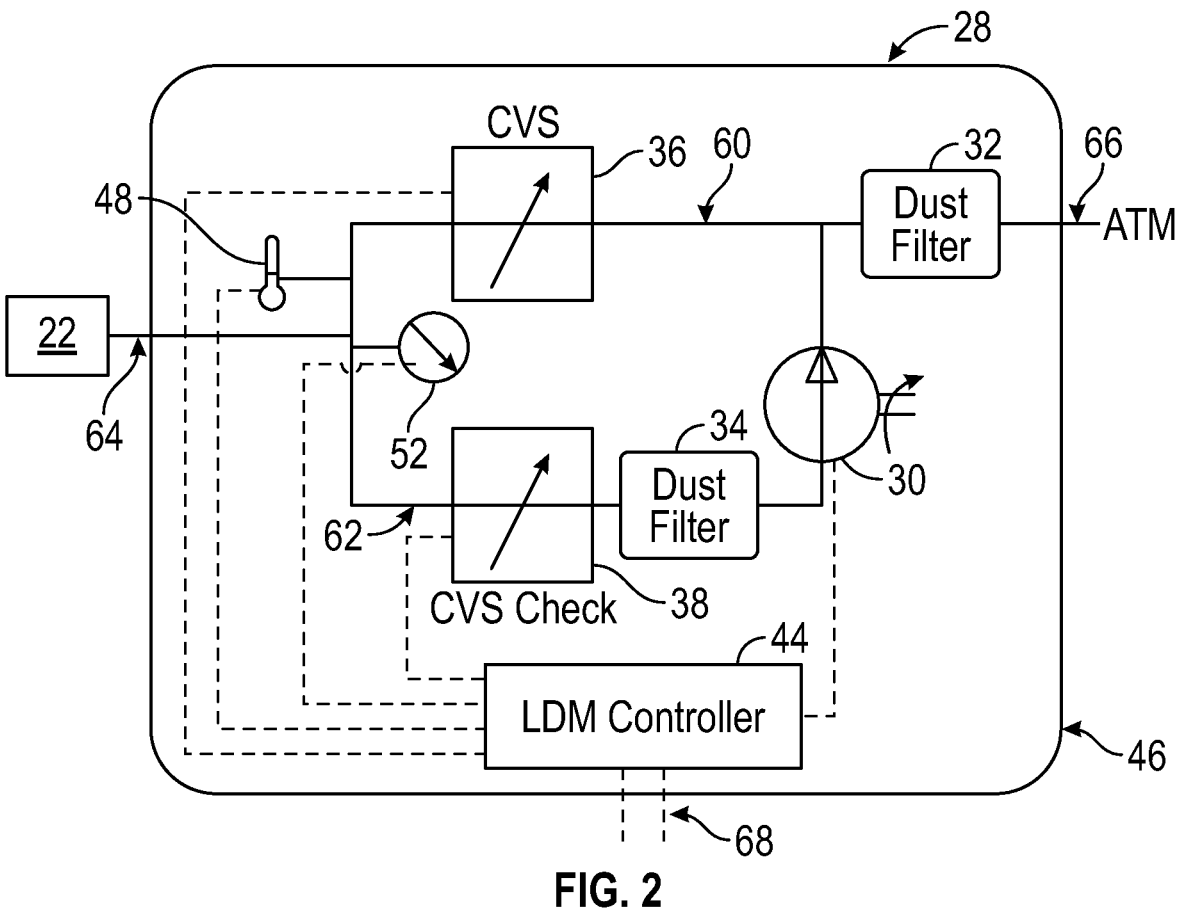
FIG. 2 is a schematic view of a leak detection module (LDM) for the system shown in FIG. 1.

Regarding the evaporative emissions system, the integrity of the system 10 must be periodically tested to ensure no fuel vapor leakage. One type of system 10 uses a leak detection module (LDM) 28, which can be used to pull a vacuum and/or pressurize the system to determine whether a leak exists, for example, using a pressure transducer 52 (FIG. 2). In one example leak test procedure, the purge valve 26 is closed and the LDM controller 44 operates the leak detection module 28 to evacuate or pressurize the system. Another pressure transducer 50 may be used to monitor the pressure of fuel vapors within the fuel tank 12 during other conditions.

An ambient temperature sensor, which is optional, is in communication with the LDM controller 44. In one example, the temperature sensor 48 is arranged within a housing 46 and in fluid communication with at least one of the first and second ports 64, 66 (FIG. 2). In another example, the temperature sensor 54 is arranged outside the LDM 28.

Referring to FIG. 2, the LDM 28 has its own controller, i.e., LDM controller 44, separate and discrete from the engine controller 40. The controllers 40, 44 are arranged remotely from one another is separate housings. Typically, the engine controller 40 is arranged at or near the vehicle's engine bay, and the LDM controller is arranged near the fuel tank 12 and/or charcoal canister 22, which is often at the rear of the vehicle. By using a separate LDM controller 44, the computation and control algorithms for leak diagnostics can be performed outside the engine controller 40, which can greatly simplify the engine controller's programming and I/O hardware. For example, instead of using eight wires from the LDM 28 to the engine controller 40, only two wires may be used between the engine and LDM controllers 40, 44 (i.e., two CAN bus wires; see at 68 in FIG. 2) Additionally, the overall power consumption during a leak test procedure may be reduce when using a separate LDM controller 44.

The LDM 28 is schematically shown in FIG. 2. The LDM 28 includes a pump 30 arranged in a housing. One example pump is disclosed in United States Publication Number US2022/403801 published on Dec. 22, 2022, entitled "PUMP FOR EVAPORATIVE EMISSIONS SYSTEM", which is incorporated herein by referenced in its entirety. Some customers prefer a system that operates using a vacuum, while other customers prefer a system that is pressurized. The rotational direction of the pump determines whether the system is pressurized or a vacuum is applied. So, to provide a pressurized evaporative emissions system test, the pump 30 will draw air from a second port 66 in fluid communication with atmosphere and through a filter 32 and direct the air towards the canister 22. Another filter 34 may be provided on the other side of the pump 30 to protect the pump from debris. To provide a depressurized or negative pressure evaporative emissions system test (i.e., vacuum), the pump 30 will draw air from the canister 22 and out to the atmosphere through the second port 66.

When the LDM 28 is not performing a leak check of the fuel system 10, a canister valve solenoid (CVS) 36 is in an open position to allow air to pass through a first fluid passageway 60 between the rest of the system 10 and atmosphere. This enables the system 10 to draw air from the atmosphere through second port 66 as needed. The CVS 36 is arranged within the housing 46 and in fluid communication along a first fluid passageway 60 between first and second ports 64, 66.

When the LDM 28 is performing a leak test of the of the fuel system 10, the CVS 36 is in a closed position, which provides a second fluid passageway 62 on the side of the canister 22. A CVS check valve 38 is arranged in the second fluid passageway 62 and selectively blocks the canister 22 from the pump 30 and atmosphere via the second port 66. The pump 30 is arranged in fluid communication along the second fluid passageway 62 between the first and second ports 64, 66. The first and second fluid passageways 60, 62 are parallel to one another, and the pressure sensor 52 is in fluid communication with at least one of the first and second fluid passageways 60, 62 and first and second fluid ports 64, 66. The pressure transducer 52 is arranged to read the pressure in the second fluid passageway 62 when the CVS 36 is closed, although the pressure transducer can be used for other purposes.

The LDM 28 contains the hardware and software necessary to determine if the system 10 has a leak to atmosphere. During a leak test, depending upon how the CVS check valve is configured the pump 30 can either create a negative pressure (vacuum) or a positive pressure in the evaporative emissions system as described above. FIG. 2B schematically illustrates the CVS check valve 38 that can be used for a negative pressure leak or for a positive pressure leak test. In one example, the CVS check valve 38 is a 2-way, 2-position valve with solenoid closure and spring open to a normally open position. The leak boundary of the system 10 includes the fuel filler 14 and cap 16, the purge valve 26, the fresh air side of the canister 22 (side connected to the LDM 28 at first port 64), the vapor dome of the fuel tank 12, and vapor lines connecting all components, including the second fluid passageway 62.

The LDM controller 44 is used to either A) make a determination if the pressure transducer reading is a pass/fail and directly return a pass or fail indication to the engine controller 40, or B) collect the pressure transducer 52 information and directly report that to the engine controller 40 so the engine controller 40 can make the determination if it is a pass/fail. However, this pressure reading is indicative of a pass/fail. During the leak test, the pressure transducer 52 is in fluid communication with the second fluid passageway 62 and monitors the pressure condition generated by the pump 30 in the system 10. The pressure transducer 52 is in communication with the LDM controller 44, which determines if there is a variation in pressure over a predetermined amount of time in the evaporative emissions system that might indicate a leak. A change in pressure detected by the pressure transducer 52, which is monitored by the LDM controller 44, can be indicative of a leak. An OBDII system 42 communicates and/or is integrated with the engine controller 40 and uses the pressure information from the LDM controller to generate engine malfunction codes that may be stored and for illuminating a "check engine" light on the vehicle instrument panel indicating vehicle service is needed.

The above-described LDM 28, its components and their functions are exemplary only. That is, fewer, more, and/or different components may be used, and the LDM 28 may perform differently that described and still fall within the scope of this disclosure.

Figure 3:
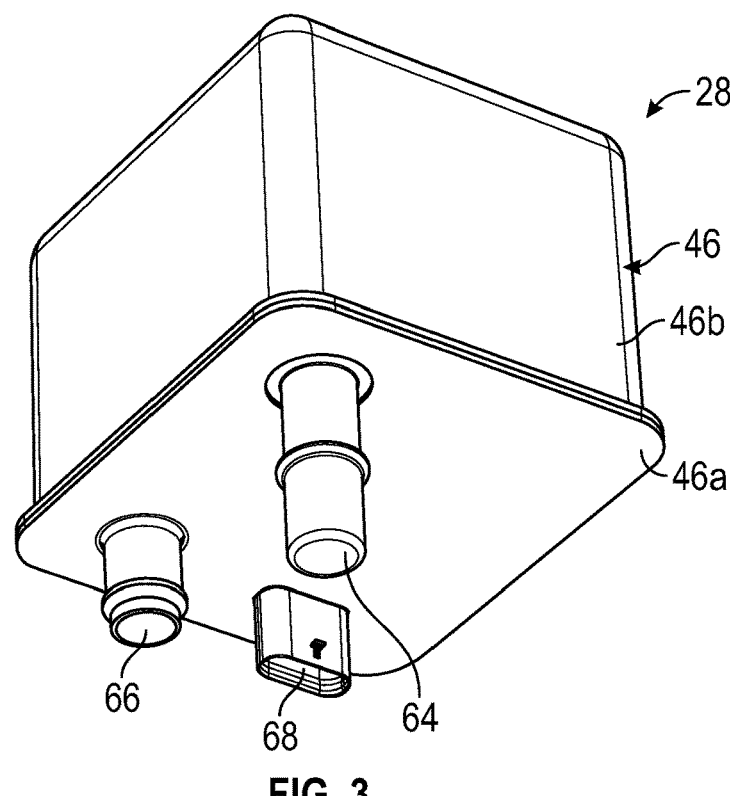
FIG. 3 is a perspective view of the LDM illustrating first and second ports and an electrical connector.
Figure 4:
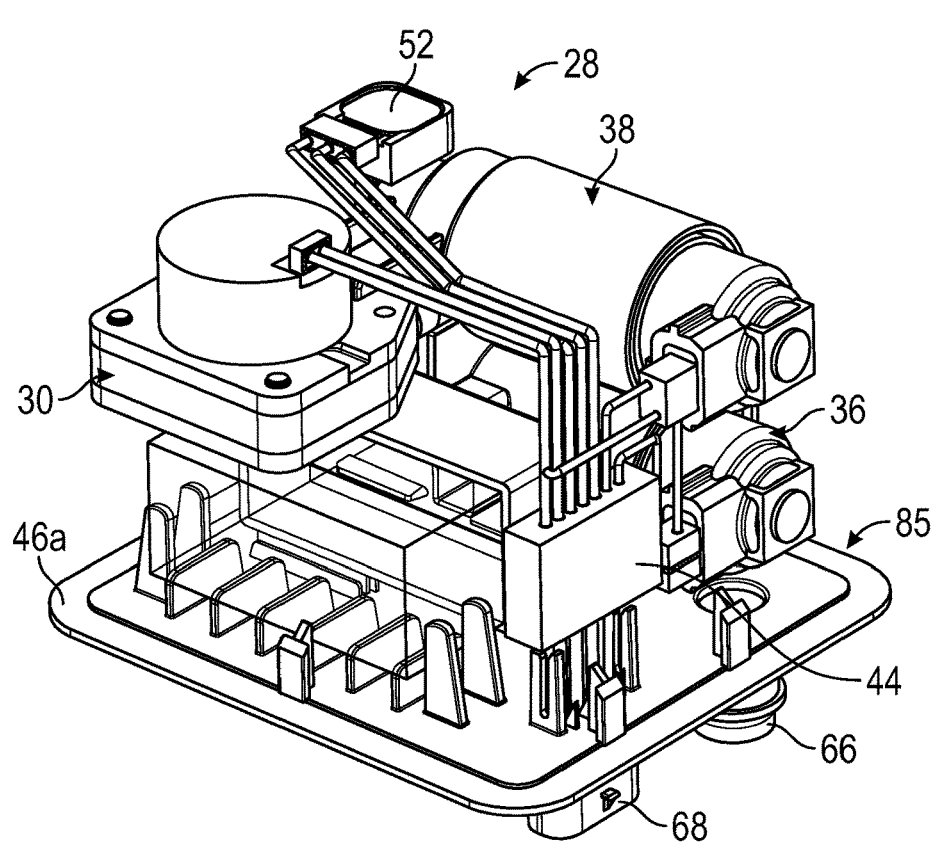
FIG. 4 is a perspective view of the LDM shown in FIG. 3 with a housing portion removed to illustrate various LDM components.

As best shown in FIGS. 3 and 4, the LDM 28 includes housing 46 having first and second housing portions 46a, 46b secured about the various LDM components. That is, the first and second housing portions 46a, 46b are sealed to one another and enclose the LDM controller 44, the pump 30, the CVS 36, the CVS check valve 38 and the pressure sensor 52. In one example, the first and second housing portions 46a, 46b are permanently joined to one another by and adhesive and/or a weld. First and second port 64, 66 are provided by the housing 46 (FIGS. 2 and 3). The first port 64 is a canister port configured to be fluidly connected to a charcoal canister 22, and the second port 66 is an atmospheric port configured to provide substantially atmospheric pressure. An electrical connector 68 is also provided by the housing 46 and is in electrical communication with the LDM controller 44, the pump 30, the CVS 36, the CVS check valve 38 and the pressure sensor 52, as shown in FIG. 4. The electrical connector 68 may include four pins: two pins for communication to the engine controller 40, and two pins for receiving power from the battery and a ground connection.

Figure 5:
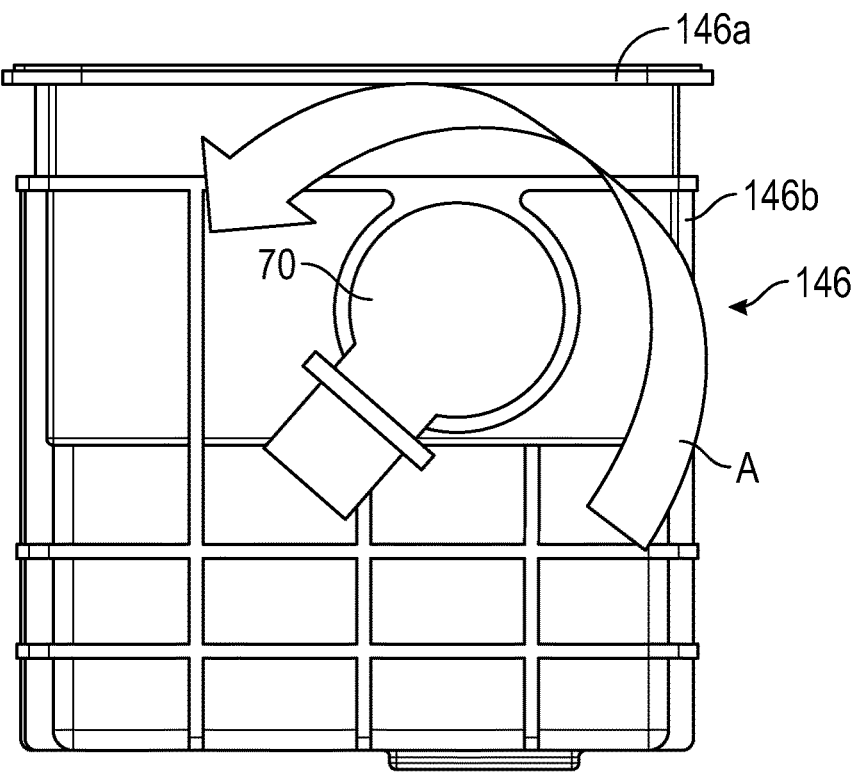
FIG. 5 is a side view of a disclosed fluid fitting providing a port on an LDM housing.

In the example, one of the first and second ports 64, 66, which are provided externally to the LDM housing 46, are provided by a configurable fluid fitting 70. The fluid fitting 70 can be oriented in a desired annular position A, as shown in FIG. 5. Moreover, different fluid fitting configurations based upon different packaging constraints may be provided such that a unique LDM housing 146 does not need to be designed and manufactured for each LDM application. This can dramatically save on tooling cost and reduce manufacturing lead times and customer approval times. In the example, the LDM housing 146 is provided by the first and second housing portions 146a, 146b, where the first housing portion 146a acts as a cover. It should be understood that other housing configurations may be provided, and the fluid fitting 70 may be positioned on either of the housing portions 146a, 146b.

Figure 6:
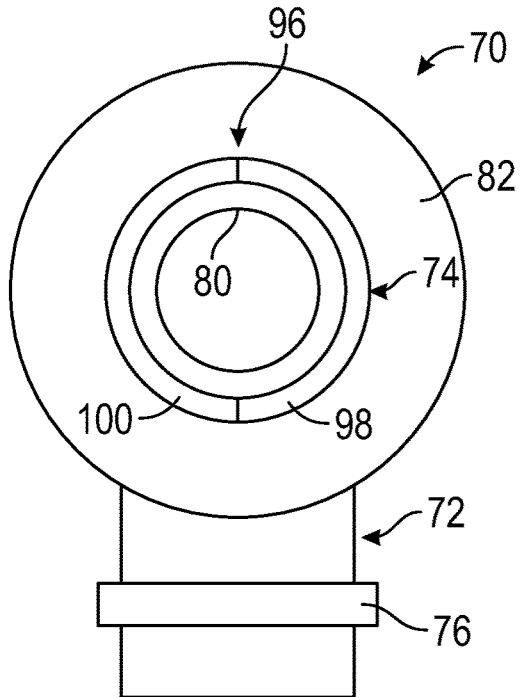
FIG. 6 is an end view of the fluid fitting.
Figure 7:
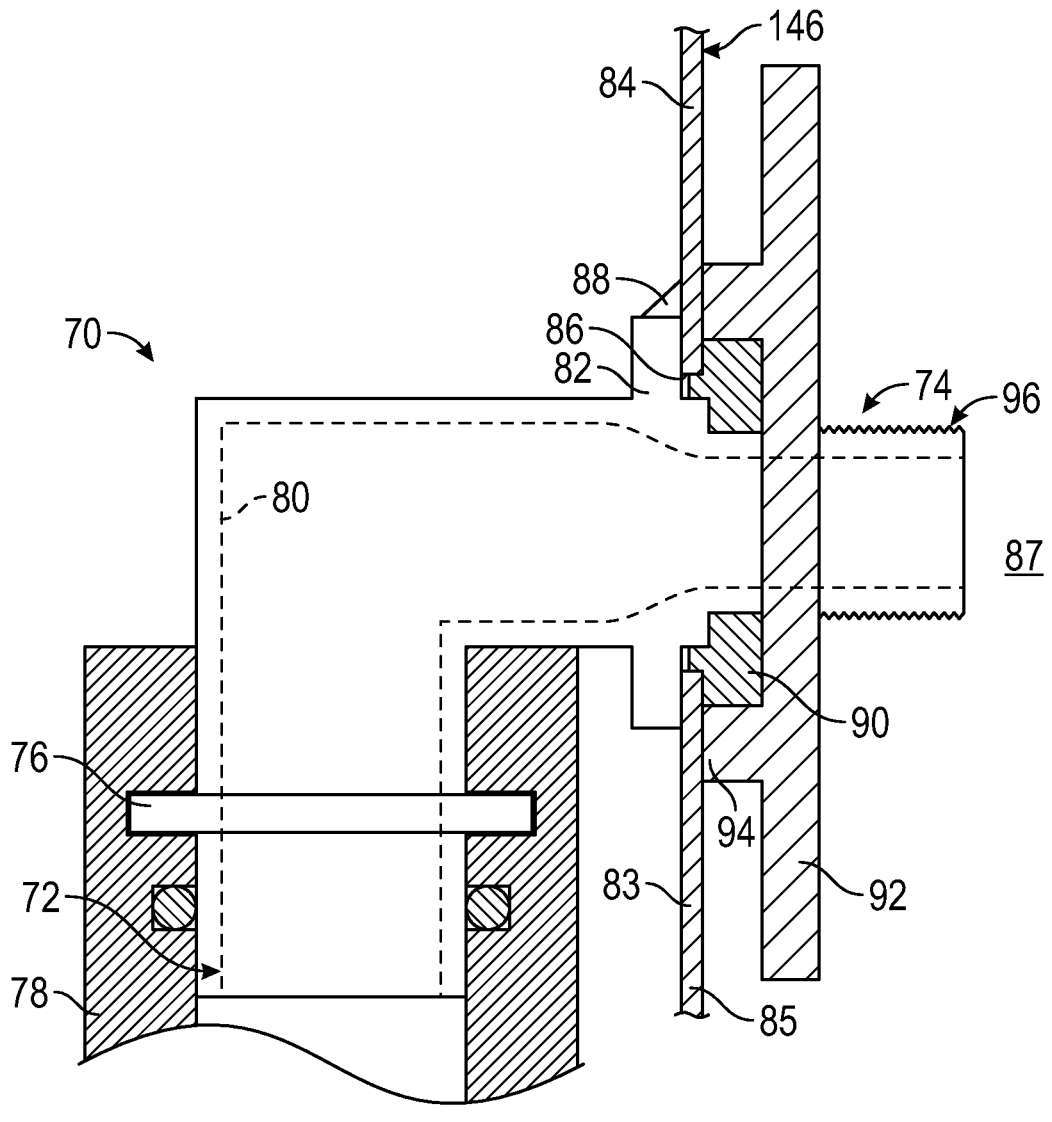
FIG. 7 is a cross-sectional view of the fluid fitting secured to a portion of the LDM housing shown in FIG. 5.

Referring to FIGS. 6 and 7, the fluid fitting 70 includes first and second end portions 72, 74 that provide a passageway 80, which communicates fluid from inside the LDM 28 to the exterior. In the example, the fluid fitting 70 is in fluid communication with at least the pump 30 and one valve, e.g., at least one of the CVS 38 and/or the CVS check valve 38. In one example, the first end portion 72 includes an annular protrusion 76, which cooperates with a typical fluid connector 78 used to other evaporative system 10 components, such as the charcoal canister 22. Other suitable connection types may be used.

The first end portion 72 includes a flange 82. A wall 84 of the housing 146 includes a hole 86 through which the second end portion 74 extends. In one example, the flange 82 abuts a first side 83 of the wall 84. During an assembly operation, a fluid fitting 70 is selected and then manipulated to a desired position for the particular application. Once in the desired position, the flange 82 may be affixed to the wall 84 with a fastener, for example, by a glue or a weld 88. The weld 88 may be provided by laser welding or staking. This type of fastener can aide in affixing the fluid fitting 70 if additional assembly operations are to be performed, for example.

The second end portion 74 may include a threaded end 96. An additional or different fastener, such as threaded nut 92 is installed onto the threaded end 96 to further clamp and secure the second end portion 72 to the wall 84. In the example, the nut 92 has an annular collar 94 that extends toward a second side 85 of the wall 84. A gasket 90 is received interiorly of the collar 94 and is arranged between the wall 84 and the nut 92 to seal the fluid fitting 70 with respect to the hole 86 and the wall 84.

To decrease the installation time and ensure consistent clamping, the threaded end 96 is provided by a multi-start thread, for example, including first and second threads 98, 100 (i.e., a two-start thread). The multi-start thread configuration may be provided in accordance to standards found in ASME B1.7-2006, for example.

Depending upon the purpose of the fluid fitting 70 in the LDM application, the second end portion 74 may have a physical connection to one of the internally located LDM components. Otherwise, the fluid fitting 70 may fluidly communicate with the internal components via a cavity 87, which is in indirect fluid communication with one or more of the LDM components (e.g., the pump and one or more valves).

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A leak detection module (LDM) comprising:

a housing providing a cavity enclosed by a wall having a hole;

a valve arranged within the housing and in fluid communication along a passage that extends between first and second ports on the LDM, the valve movable between open and closed positions;

a pump arranged within the housing and in fluid communication with the passage, and an electric motor arranged in the housing for rotational driving the pump;

a fluid fitting extending through the hole and having a passageway extending between first and second end portions, the passageway in fluid communication with the pump, the fluid fitting is arranged at an angular orientation and provides one of the first and second ports;

a canister valve solenoid (CVS) arranged within the housing and in fluid communication along the passage, the CVS movable between open and closed positions;

an electrical connector provided by the housing and in electrical communication with the electric motor and the CVS; and a fastener securing the fluid fitting in the angular orientation relative to the wall.

2. The LDM of claim 1, wherein the wall has first and second sides opposite one another, the first end portion has a flange against the first side, the fastener is secured to the second end portion adjacent the second side clamping the fluid fitting to the wall.

3. The LDM of claim 1, wherein the wall has first and second sides opposite one another, the first end portion has a flange against the first side, the fastener secures the flange to the first side.

4. The LDM of claim 3, wherein the fastener is a weld.

5. The LDM of claim 2, comprising a seal arranged about the second end portion and between the fastener and the second side.

6. The LDM of claim 5, wherein the fastener includes a collar extending from the fastener toward the second side, and the seal is arranged inboard from the collar.

7. The LDM of claim 1, wherein the fastener includes threads.

8. The LDM of claim 7, wherein the threads are provided by a multi-start thread configuration.

9. An evaporative emissions system comprising the LDM of claim 1, comprising a connector attached to the second portion and fluidly connected to another portion of the system.

10. The LDM of claim 9, wherein the other portion is a charcoal canister.

11. The LDM of claim 3, wherein the flange is affixed to the first side.

12. The LDM of claim 4, comprising a second fastener, wherein the second fastener includes threads.

13. The LDM of claim 12, comprising a seal arranged about the second end portion and between the second fastener and the second side.

14. The LDM of claim 13, wherein the second fastener includes a collar extending from the second fastener toward the second side, and the seal is arranged inboard from the collar.

15. The LDM of claim 12, wherein the threads are provided by a multi-start thread configuration.

16. The LDM of claim 1, wherein the fitting has a bend such that the passageway is non-linear, the angular orientation corresponding to a position of the one of the first and second ports resulting from the bend.

* * * * *